United States Patent [19]

Frei

[11] Patent Number: 4,600,561
[45] Date of Patent: Jul. 15, 1986

[54] METHOD AND DEVICE FOR SEPARATING HARMFUL SUBSTANCES FROM A FLUE GAS

[75] Inventor: Willi Frei, St. Gallen, Switzerland

[73] Assignee: Air Frohlich Ag für Energierückgewinnung, Arbon, Switzerland

[21] Appl. No.: 684,068

[22] Filed: Dec. 20, 1984

[30] Foreign Application Priority Data

Dec. 23, 1983 [DE] Fed. Rep. of Germany ....... 3346865

[51] Int. Cl.$^4$ .............................................. B01D 50/00
[52] U.S. Cl. .................... 422/170; 422/172; 422/173; 55/27; 55/37; 55/73; 55/222
[58] Field of Search .............. 422/170, 173, 172; 55/222, 268, 27, 37, 73, 80

[56] References Cited

U.S. PATENT DOCUMENTS

| | | | |
|---|---|---|---|
| 945,112 | 1/1910 | Smith | 422/170 |
| 1,296,462 | 3/1919 | Blumberg | 422/172 |
| 1,297,639 | 3/1919 | Blumenberg | 55/222 |
| 2,090,142 | 8/1937 | Nonhebel et al. | 55/73 X |
| 3,795,486 | 3/1974 | Ekman | 422/172 X |

FOREIGN PATENT DOCUMENTS

| | | |
|---|---|---|
| 2263319 | 8/1973 | Fed. Rep. of Germany . |
| 2161475 | 5/1974 | Fed. Rep. of Germany . |
| 120072 | 9/1927 | Switzerland ................. 55/222 |

Primary Examiner—Robert Lindsay
Attorney, Agent, or Firm—Shapiro and Shapiro

[57] ABSTRACT

In the method and device for separation of harmful substances from a flue gas, in an absorption-heat exchanger arrangement both washing and also cooling of the flue gas is carried out, the flue gas being cooled below the dew point and this cooling process taking place by means of exterior air in counter flow. The flue gas is divided during its passage through the heat exchanger into at least two parallel part flows of which the first part flow is directed into a first treatment zone and the second part flow is directed into a second treatment zone. The two treatment zones are connected parallel to one another. In the first treatment zone a first absorption liquid is introduced into the flue gas which effects extensive removal of harmful substances from the flue gas, while in the second treatment zone a second absorption liquid is introduced into the flue gas, in which second absorption liquid precipitated harmful substances are soluble, to clean equipment surfaces. These two treatment zones are cyclically exchanged.

22 Claims, 4 Drawing Figures

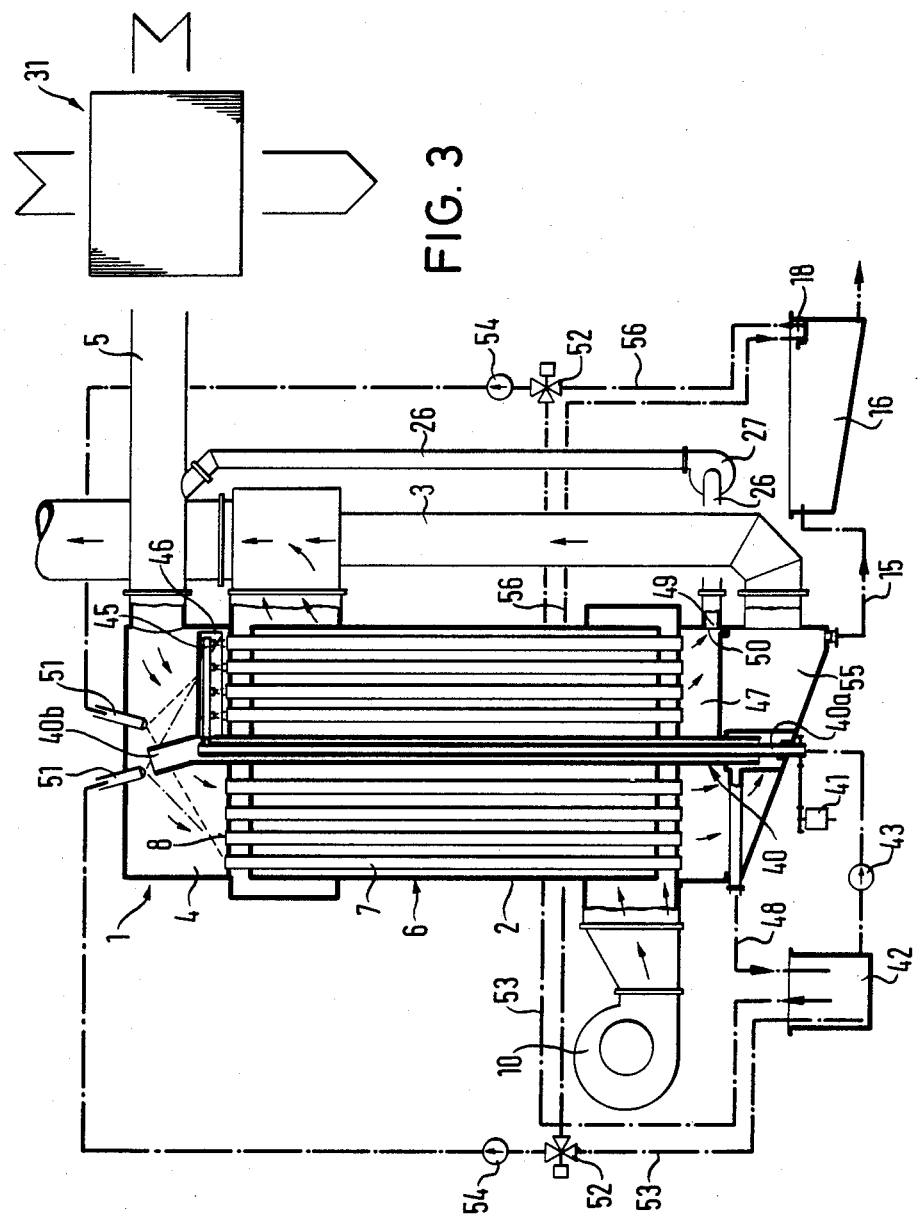

METHOD AND DEVICE FOR SEPARATING HARMFUL SUBSTANCES FROM A FLUE GAS

The invention relates to a method for the separation of harmful substances from a flue gas and also to a device for carrying out the method.

Such methods and devices have been known in various embodiments for a long time. Normally, for cleaning waste gas containing a sulfur oxide, -e.g. sulfur dioxide, a calcium carbonate suspension, a lime solution, a calcium oxide suspension or a mixture thereof is used as absorption liquid. Since, however, calcium sulfite or calcium sulfate precipitated from the flue gas during washing with such an absorption liquid has a low solubility, after a relatively short time these precipitates build up in the absorption devices to form a deposit in the form of scale. As a consequence, the absorption devices suffer increasing pressure loss and reduction in effectiveness.

It has previously been attempted to remove this scale from such devices either mechanically or chemically. The invention relates to the development of a chemical method and system.

German Auslegeschrift No. 2 161 475 discloses a method and apparatus of the assumed type in which the flue gas flows through a cooling tower and thereafter through two absorption towers. In the first absorption unit the pH value is maintained lower than 4 for removal of the scale, while in the second unit connected in series with the first, a pH value greater than 7 is set in order to achieve a gas cleaning effect which is as thorough as possible. By cyclic switching of the flue gas flow and control of the pH values in the two absorption towers, that is, by oppositely directed operation of the devices connected in series, cleaning of the apparatus is achieved with constant effectiveness of sulfur removal without interrupting operation. In this known method, there are significant disadvantages in that three towers must be provided, necessitating high investment costs, and in that the pressure loss on the flue gas side of the apparatus be overcome, resulting in high energy requirements. Also operation of the cooling tower, in which simultaneously the solid component parts are removed from the flue gas by means of distilled water, requires considerable fresh water consumption and prevents use of the residual energy in the flue gas. Furthermore in operation of the absorption towers, fresh water must be used in order to form scale sludge. Finally in the case of a defect occurring in one of the two absorption towers, the entire cleaning plant must be shut down.

An object of the invention is to provide a method and apparatus for separating harmful substances from a flue gas, whereby efficient cleaning is achieved with simple, economic and operation combined with simple, economic and compact construction.

Generally speaking, the foregoing object is achieved in accordance with the invention, by dividing the flue gas stream into two parallel flows directed through two treatment zones. In one zone the gas is contacted with a first liquid which cleans the gas, such as a liquid containing neutralized condensate, while in the second zone the gas is contacted with a second liquid suitable for cleaning deposits from the equipment of that zone, such as a liquid containing untreated condensate. The two zones are periodically exchanged to effect cleaning of the entire system.

A first basic distinction between the known mode of operation described earlier and the method according to the invention is that in the known technique the absorption devices are connected in series and cyclic reversal of the mode of operation takes place. The concept according to the invention is in contrast characterised by a parallel connection of the various treatment zones and parallel operation of these two treatment zones. The concept according to the invention is based therefore on a different type of principle. This principle offers very significant practical advantages, as will be explained hereinafter.

A further marked difference between the state of the art and the invention will be seen in that the invention admits a single arrangement in which simultaneously both cooling and washing of the flue gas can be carried out. More particularly, the invention may be carried out with an absorption-heat exchanger. By this means a particularly compact device can be produced.

Absorption-heat exchangers are, of course, known per se (See, e.g., German Offenlegungschrift No. 2263319). Known absorption-heat exchangers, however, the problem of chemical cleaning of scale in the washing of sulfur dioxide containing combustion gases using appropriate absorption liquids is neither addressed nor solved.

Furthermore, in a preferred form of the method according to the invention, the flue gas is cooled below the dew point in the absorption-heat exchanger. The condensate which can thereby be removed from the flue gas increases the cleaning effect by increasing the total amount of absorption liquid. In this way the absorption liquid and flue gas are brought together in contact along a relatively long flow path and thereby over a long dwell time and in addition across large exchange surfaces.

A further substantial advantage of the concept according to the invention may be seen in that by virtue of the parallel flow principle, in the case of failure of one of several treatment zones the remaining treatment zones can still be operated, whereas in the known construction such an event compels shutdown of the entire plant.

The invention may also be implemented in a system of absorption towers. The flue gas is divided into two part flows and supplied in parallel to two treatment zones. With a total number of six absorption towers, five absorption towers for example may be driven in each case for gas cleaning, while the remaining single absorption tower is driven for equipment cleaning. Control of the pH values and the cyclic reversal of the individual treatment zones, which are formed by one tower in each case, takes place in the later described manner.

In the method according to the invention the first treatment zone (gas cleaning) may be used to conduct therethrough a larger part flow of the flue gas than through the second treatment zone in which cleaning of the plant equipment takes place. In this manner the gas is predominantly subjected to the desired cleaning so that only a part of the gas cleaning operation is relinquished and the cleaning of a smaller part of the plant equipment is undertaken. Then in the course of the operation a part of the first treatment zone is exchanged with the second treatment zone for equipment cleaning, while the second treatment zone in which the plant equipment cleaning has been undertaken is utilized again for gas cleaning.

In the cleaning of sulfur dioxide-containing flue gas, it is expedient generally advantageous that the first absorption liquid is lime water, calcium oxide suspension, calcium carbonate suspension or a mixture thereof, while the second absorption liquid is water in which sulfuric acid from the flue gas is dissolved, i.e. untreated condensate. The cleaning of the plant equipment thus takes place with untreated condensate which by multiple passage through the second treatment zone is made acidic and thus dissolves the scale of calcium sulfite or sulfate which is formed during the gas cleaning phase.

It is furthermore of advantage when precooling of the flue gas to 40° C. to 60° C. is undertaken with the aid of heat recovery. By this means a substantial part of the heat can be recovered from the flue gas. Thus a plant driven according to the method of the invention can operate with good energy efficiency.

By precooling with heat recovery, two further advantages may be achieved. First of all, the recovered heat can be usefully employed for further processes. Secondly, the flue gas reaches the cleaning arrangement in a more advantageous condition since it is then substantially already cooled to the dew point. Therefore, condensate formation begins immediately in the heat exchanger and the desired amount of condensate is actually separated in the heat exchanger. In addition to the entry temperature of the flue gas into the arrangement, which, as explained above, may be usefully achieved by the provision of a heat recovery stage, the amounts per unit time of exterior air and flue gas which flow through the heat exchanger are of course also important. In this connection the correct dimensioning of the heat exchange surfaces as appropriate for a given application is significant. The correct amounts per unit time of the surrounding air and the flue gas are of course also important in connection with mixing of the two streams to prevent mist formation in accordance with an advantageous feature of the invention.

By mixing the cleaned flue gas with the exterior air introduced for cooling of the flue gas before entry into the atmosphere, the dew point of the gas mixture is lowered, whereby formation of mist is counteracted. Furthermore, as a result of the diluting effect achieved small amounts of harmful substances possibly remaining in the flue gas are released into the atmosphere in a permissible manner.

A further preferred feature of the method according to the invention consists in that the flue gas from the second treatment zone (plant cleaning) is guided back into the wash cycle. By this technique a particularly thorough cleaning of the flue gas is achieved, in that the flue gas which is not so well cleaned of harmful substances in the treatment zone which serves for plant equipment cleaning is subjected to a further cleaning cycle.

Finally, in a preferred form of the method according to the invention, 5/6 of the flue gas flow to be cleaned is passed through the first absorption liquid and 1/6 is passed through the second absorption liquid. The reversal cycle takes one to four hours. By this means a particularly affective implementation of the method according to the invention can be achieved.

According to the nature of the fuel from which the flue gas to be treated is produced, a condensate pH value of up to 1.0 can occur, while after exit from the treatment zones which serve for gas cleaning the absorption liquid should have a pH value of at least 5. By means of two absorption liquids of such different values (e.g., untreated and treated condensate), particularly good cleaning of the plant equipment is achieved by the relatively acidic (low pH) liquid which represents the so-called second absorption liquid, and good sulfur dioxide absorption is achieved in the treatment zones serving for gas cleaning by means of the more neutral liquid (higher pH) which constitutes the first absorption liquid.

The apparatus according to a preferred embodiment of the invention is basically characterised in that an absorption-heat exchanger arrangement for simultaneous cooling of the flue gas below the dew point and washing of the flue gas is provided, and that in this absorption-heat exchanger arrangement at least two operational zones are connected parallel to one another. The flue gas is, as already explained, divided into two parallel part flows of which one part flow is conducted through the first treatment zone and the other is conducted through the second treatment zone.

The apparatus according to the foregoing embodiment is also marked by a compact construction in which the functions of cooling and washing of the flue gas are integrated in a single apparatus, that is to say in an absorption-heat exchanger. Referring to the heat exchanger, the two differing operational zones, that is to say the one for gas cleaning and the other for equipment cleaning, are constructed identically so that simple assembly of the construction is ensured.

In a preferred form the heat exchanger comprises a plurality of parallel arranged pipes, the flue gas being guided into the pipes and the cooling air in the space between the pipes. The pipes of the heat exchanger extend vertically and the flue gas flows through the pipes downwardly while the cooling air is guided in the opposite flow direction or upwardly.

As a result two advantages are achieved. First of all a chimney-like construction is achieved for the absorption-heat exchanger. This favors the presence of a long flue gas stack in which good mixing of the flue gas to be released into the atmosphere and the exterior air introduced as cooling air can take place, with the purpose already explained. The counter-flow principle in respect of the guidance of the flue gas and the cooling air leads furthermore to effective cooling of the flue gas below the dew point and to an optimal use of the exchange surfaces.

Further advantage may be derived from arrangement of the spray nozzles for the absorption liquid outside the entry for the flue gas in the heat exchanger, so that unidirectional flow washing takes place. As a result of this provision the condensate flows from the flue gas, upon cooling is below the dew point to form additional absorption liquid which flows in the washing direction, having the consequence of a particularly good washing effect. This effect is enhanced by the use of exchange surfaces which are as large as possible, thereby maintaining a particularly long process time. A particularly simple construction of the device according to the invention is achieved when the tubes of the heat exchanger are arranged in an annular shape a plurality of sectors each constituting a zone. By this means the operational zones of the heat exchanger have an identical construction. Either the first or the second absorption liquid is utilized in an individual zone.

For supplying the operational zones in each case with the first or the second absorption liquid, two techniques are hereinafter described.

The first variation is characterised in that to each operational zone a respective supply system for the absorption liquid is assigned which can be switched from the first to the second absorption liquid and back again.

The second technique may be seen in that all treatment zones have a spray nozzle arrangement for the first absorption liquid and a further spray nozzle arrangement is provided for the second absorption liquid which is adjustable selectively via the entrance of the respective treatment zone which is driven with the second absorption liquid.

The invention will be explained in the following description in more detail with reference the attached drawings which represent exemplary embodiments of the invention and in which:

FIG. 3 shows a schematic representation of a longitudinal section through a second exemplary embodiment of the device according to the invention.

Figure 2:
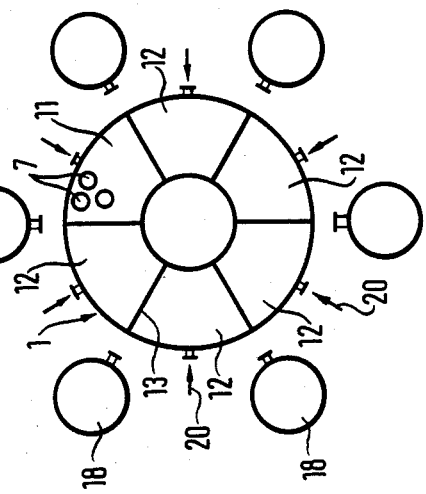
FIG. 2 shows a cross-section through this exemplary embodiment according to the section II—II of FIG. 1.
Figure 1:
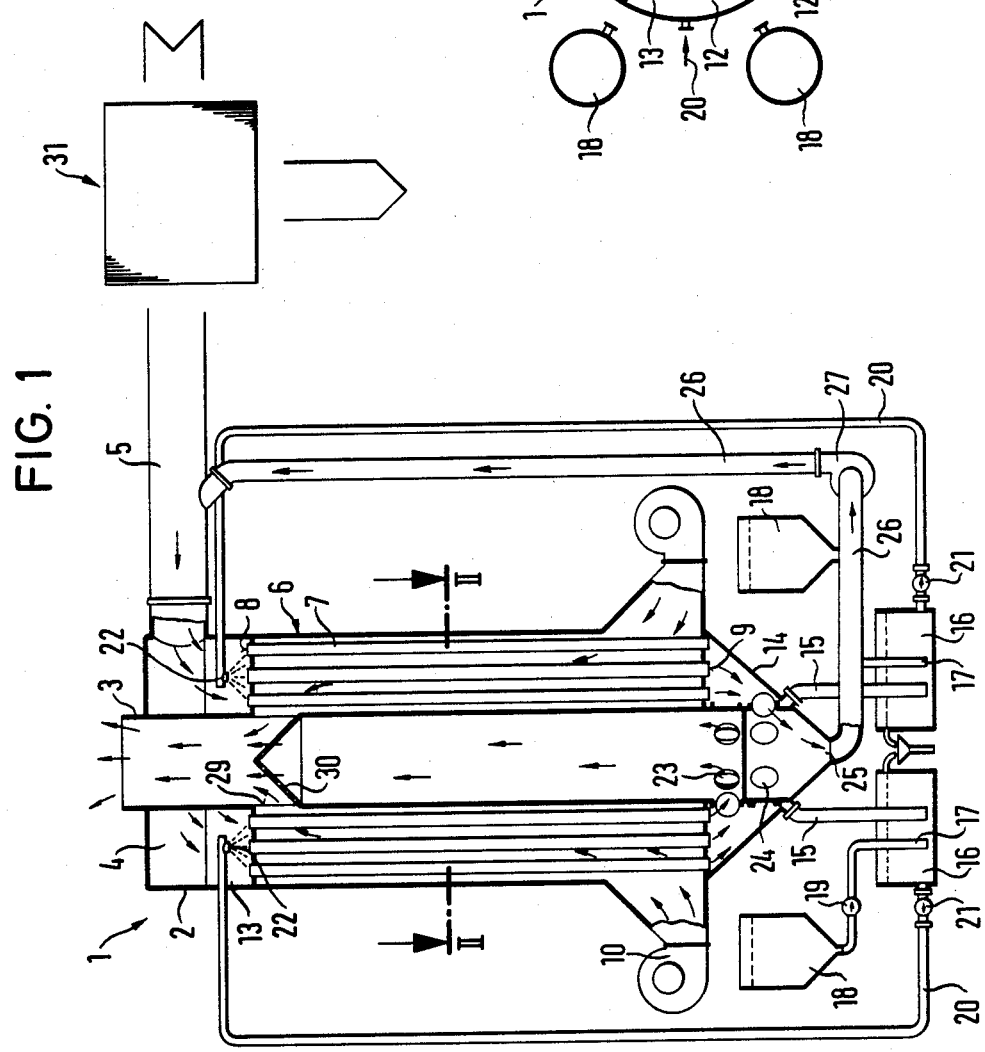
FIG. 1 shows a schematic view of a vertical section through a first exemplary embodiment of the device according to the invention.

In FIGS. 1 and 2 which represent a first exemplary embodiment, an absorption-heat exchanger unit is designated by reference numeral 1. Heat exchanger unit 1 is constructed substantially in the form of a chimney or tower. It has a substantially cylindrical vertical housing 2 in which a tubular flue gas stack 3 is centrally arranged. At the upper end of the housing 2 there is provided an annular distribution chamber 4 into which discharges an entry duct or conductor 5 for the flue gas to be cleaned. Most of the height of the housing 2 is occupied by a heat exchanger 6 which consists of vertically extending tubes 7 for the passage of the flue gas. On the opposite ends of the tubes 7 are connected intermediate members between the tubes 7 so that an upper entry 8 and a lower exit 9 is formed for the flue gas. The entry 8 and the exit 9 of the heat exchanger 6 are preferably arranged within six sectorlike zones grouped around the flue gas stack 3 and subdivided with the aid of radial walls 13. Five of the zones, here designated as 12, form in a manner to be described in more detail a first operational zone, while one of the zones, here designated as 11, constitutes a second operational zone. All zones 11 or 12 have, on the lower side of the housing 2, a cooling air blower 10 which directs drawn in fresh air onto the lower end of the heat exchanger 6 between the tubes 7 so that the cooling air has a flow direction from the bottom upwardly, thus in counter current to the flue gas flow. On the lower part of the housing 2, beneath the lower exit 9 of the heat exchanger 6, there is a collecting body 14 similarly subdivided into zones, which body serves for reception and further guidance of the emerging flue gas and of the condensate. The bottom of each zone of the collecting body 14 is connected via a corresponding condensate conductor 15 to an associated container 16. Corresponding conductors 17, connected to associated lime water containers 18, discharge into the respective containers 16. In each conductor 17, there is provided a metering arrangement 19. From each one of the containers 16 a conductor 20 having a pH measuring device 21 leads to the interior of distribution chamber 4 where it ends in spray nozzles 22 which are arranged above a entrance 8 of the respective zone 11 or 12.

In a cylindrical inner wall of the collecting body 14 there are provided for each zone 11 or 12 two openings 23 and 24 which are alternately closable by means of shutters. The upper opening 23 is in each case in communication with the flue gas stack 3. The lower opening 24 leads into a chamber 25 separated from the flue gas stack, which chamber is connected to entry duct 5 via a bypass line 26, in which an additional blower 27 is arranged.

The heat exchanger 6 has at its upper end on its inner wall facing the flue gas stack 3, openings 29 which provide communication to the flue gas stack. At the height of the openings 29 there is provided in the flue gas stack 3 a perforated entry roof 30 which serves for better mixing of the flue gas with the heated cooling air.

A heat recovery apparatus 31 which operates in a well known manner is connected before the absorption-heat exchanger 1, as indicated diagrammatically in FIG. 1.

The device according to FIGS. 1 and 2 operates as follows:

The flue gas which is pre-cooled in the heat recovery apparatus 31 preferably to a temperature of 40° C. to 60° C., enters via the entry conductor 5 into the annular dividing chamber 4 in which it is evenly divided in part flows into the six zones 11 and 12. At the entry 8 of each zone 11 or 12, an absorption liquid is sprayed via the spray nozzles 22 onto the exchange surfaces of the absorption-heat exchanger. A first absorption liquid containing condensate neutralized with a calcium hydroxide or similar limestone suspension is sprayed into the five zones 12, while a second absorption liquid containing untreated condensate is sprayed into the sixth zone 11. It has been found that the untreated condensate, which contains sulfuric acid as a result of the sulfur dioxide washed from the flue gas, has an excellent cleaning effect on the deposits which usually appear in flue gas cleaning plants. The desulfurizing effect of the zone being cleaned is relatively low so that the only partially desulfurized flue gas is directed to the zone outlet 9. The partially desulfurized gas is recycled via a corresponding one of openings 24, conductor 26 and blower 27 back to the entry duct 5.

In the remaining five zones 12 in which the neutralized condensate is sprayed, the contact between the first absorption liquid and the flue gas results in very effective removal of sulfur. Simultaneously, as a result of the exterior air cooling in the heat exchanger 6, condensate is continuously recovered from the flue gas so that no fresh water is required for operation of the system. The cleaned flue gas flows finally through the openings 23 from the individual zones into the central flue gas stack 3 and thereafter through the perforated roof 30 of the flue gas stack, whereupon it mixes with the heated cooling air flowing from the openings 29. This mixing dilutes the flue gas, which then discharges into the atmosphere.

The condensate formed in the absorption-heat exchanger 1 flows from zones 11 or 12 to the corresponding containers 16 via the collecting body 14 and the condensate conductors 15. For each of the five zones 12 neutralization of the condensate takes place with calcium hydroxide or a similar lime suspension, which is introduced from the corresponding lime water container 18 and conductor 17 into the associated container 16 through the associated metering device 19. From the container 16, the neutralized condensate is directed via the associated pH measuring apparatus 21 and condensate line 20 to the corresponding spray nozzles 22. Regulation of the amount of lime suspension is achieved by means of the pH measuring apparatus 21. For satisfactory sulfur dioxide separation the condensate at the outlet 9 of the absorption-heat exchanger should have a pH value of at least 5. In the sixth zone 11 the condensate is not treated, thus not neutralized, but is directed in untreated condition through the associated pH measuring apparatus 21 and line 20 to the corresponding nozzles 22. The untreated condensate has a very low pH value, which can be as low as 1 depending on the combustion material, whereby the scale located on the walls of the tubes of this zone is dissolved and removed with the absorption liquid.

A cleaning effect for the entire system is achieved in that at time intervals of preferably one to four hours the operation with pure unneutralized condensate is switched over from one zone to another. Each zone is provided with its own container and pipe network, and all parts of the flue gas cleaning plant which come into contact with the absorption liquid are maintained cleaned.

Operational reliability of the system is increased by the fact that the cleaning of the flue gasses is accomplished only one of the total of six installed zones being relinquished for equipment cleaning. More particularly, since all six zones 11, 12 are provided with independent condensate preparation equipment, upon the occurrence of a defect in one zone 11, 12 the defective zone can immediately be switched out of operation. The system can then continue to operate using the remaining zones in the manner described hereinabove (i.e., four gas cleaning zones and one zone for equipment cleaning). It has been found that even with a delay of the switch-over operation of several hours, upon reestablishment of normal operation according to the invention no permanent encrustations appear by virtue of the intensive cleaning effect.

Figure 4:
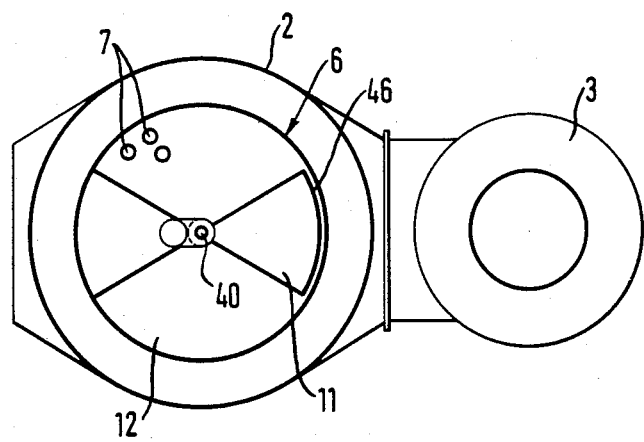
FIG. 4 shows a plan view of the device according to FIG. 3.

A second basic embodiment of the device may be seen from FIGS. 3 and 4. The parts which are comparable to those in FIGS. 1 and 2 are provided with the same reference characters.

In this construction, the flue gas stack 3 is guided outside the housing 2 in which the heat exchanger 6 is arranged, and is thus directed parallel to the axis of the housing 2 or the pipes 7 of the heat exchanger 6. By this provision, compared with the above-described construction a reduction both of the diameter of the flue gas stack 3 and also of the exterior dimensions of the heat exchanger results which leads to an altogether more compact and economic assembly.

Centrally of the heat exchanger 6 runs a double-sleeved tube 40 which may be placed in a cyclically switching or a continuous rotational movement by means of an externally arranged motor drive 41. To an inner tube 40a of the double sleeve tube 40, untreated condensate, i.e. acidic absorption liquid, is supplied by means of a pump 43 from a container 42. Inner tube 40a feeds upwardly to a spray nozzle arrangement 45 which is rigidly secured to the double sleeve tube 40 and thus rotatable with tube 40. By means of this spray nozzle arrangement 45, the acidic condensate, i.e. the second absorption liquid, is successively sprayed into each operational zone of the heat exchanger 6 whereby the cleaning of the system is achieved.

To supply the first absorption liquid for the cleaning of the gas, a central double spray nozzle arrangement 51 is provided which is located above the spray nozzle arrangement 45. In order to prevent mixing of the first absorption liquid supplied from the central spray nozzle arrangement 51 with the second absorption liquid supplied from the spray nozzle arrangement 45, and thereby intrusion of the first absorption liquid into the treatment zone of equipment heat exchanger 6 in which the cleaning is taking place, the spray nozzle arrangement 45 has a sector-shaped cover 46 which extends almost to the upper entry surface 8 of the heat exchanger 6. Cover 46 allow unhindered entry of one sixth of the flue gas to be treated into the operational zone 11 in which cleaning of the plant takes place. This operational zone comprises, as with the above described exemplary embodiment, one sixth of the heat exchange pipe 7. The the untreated condensate produced by the spray nozzle arrangement 45, i.e. the second absorption fluid, flows through this one sixth of the heat exchange pipe 7 downwardly and is collected by a collection body 47 which is rigidly fixed to the double sleeve tube 40. Collection body 47, which and is also sector-shaped, is arranged directly beneath the lower outlet 9 of the heat exchanger and is aligned with the spray nozzle arrangement 45. The untreated condensate collected in the sector-shaped collecting body 47 flows downwardly through an opening located in the double sleeve tube, into the annular clearance flows of the tube and then via a syphon 48 back into the container 42 for the untreated condensate, i.e. the second absorption liquid. In addition to the sprayed condensate, collecting body 47 also receives any condensate which is formed by the condensation of the flue gas passing through the zone being cleaned. The collecting body 47 has at its outer periphery and spaced from the body bottom an opening 49. The incompletely cleaned flue gas flow from the heat exchanger zone being scaled passes through opening 49 into an annular flue gas conductor mounted on the lower collecting body of the heat exchanger, from which—independently of the position of a segmented rotary slide valve 50—the flue gas is fed by means of the bypass blower 27 back again into the entry conductor 5.

An outer tube 40b of the central double sleeve tube 40 has on its upper end an offset extension which ends eccentrically and which, in each of two positions of the rotary slide valve 50, is located exactly opposite one of the spray nozzle units 51. With a dual arrangement, as shown, the spray nozzle units 51 can be alternately driven with acidic untreated condensate, i.e. with the second absorption liquid, and thereby can be freed of deposits. For this purpose, it is preferable to provide a main washing pump 54 for each spray unit, as shown. Each pump may be fed from the outlet of a corresponding three-way valve 52 the two inlets of which are connected respectively to the container 42 for the untreated condensate via a conductor 53 and to the container 16 for the first absorption liquid, i.e. for the neutralized condensate, via a conductor 56. With this arrangement, thus the entire conductor system with all fittings can be periodically driven with acidic condensate, i.e. with the second absorption liquid, for each half of a complete rotation of the double tube 40. During such mode of operation, the acidic condensate flows through the offset outer tube 40b via the double sleeve of the tube 40 downwardly and passes via the syphon back again into the container 42 for the acidic condensate, whereby the circuit is completed. Preferably, the main pump 54 has its rotational speed reduced by suitable provisions during this operational phase, which for example can be achieved by means of a pole-switchable drive. The resulting decrease in pump output reduces energy requirements for the pump drive, whereby the economy of the plant is improved.

The remaining five operational zones 12 of the absorption-heat exchanger 1 operate as previously described. However, in contrast to the plant already described with reference to FIGS. 1 and 2, the collection body 55 beneath the outlet 9 of the heat exchanger 6 is no longer divided into six zones but receives the first absorption liquid from all zones. From this collection body 55, the first absorption liquid is supplied via a conductor 15 into the container 16 where it is neutralized to a predetermined pH value in the manner already described.

What is claimed is:

1. Method for the separation of a harmful substance from a flue gas, and especially from sulfur oxide containing combustion gas, in which
   (a) in a single absorption heat exchanger arrangement cooling and washing the flue gas is carried out simultaneously, with the flue gas being cooled below the dew point;
   (b) said cooling is carried out by external air in counter flow to the flue gas flow;
   (c) the flue gas is divided in its passage through the absorption heat exchanger arrangement into at least two parallel partial flows, of which the first flow is conducted through a first treatment zone and the second flow is conducted through a second treatment zone;
   (d) in the first treatment zone a first absorption liquid is introduced into the flue gas to effect extensive removal of said harmful substance from the flue gas while in the second treatment zone a second absorption liquid is introduced into the flue gas, precipitated harmful substance being soluble in said second absorption liquid;
   (e) the two treatment zones are cyclically exchanged; and
   (f) condensate obtained from the flue gas and the absorption liquid are guided in unidirectional flow through said heat exchanger.

2. Method according to claim 1 wherein the first absorption liquid is lime water, calcium dioxide suspension, calcium carbonate suspension or a mixture thereof, and wherein the second absorption liquid is water and sulfuric acid from the flue gas dissolved therein.

3. Method according to claim 1 wherein pre-cooling of the flue gas to 40° C. to 60° C. is carried out by means of heat recovery.

4. Method according to claim 1 wherein the cleaned flue gas is mixed with said external air before discharge into the atmosphere.

5. Method according to claim 1 wherein flue gas which passes through the second treatment zone is returned into the washing cycle.

6. Method according to claim 1 wherein five sixths of the flue gas is treated with the first absorption liquid and one sixth of the flue gas is treated with the second absorption liquid, and wherein the first and second treatment zones are exchanged according to a switching cycle lasting one to four hours.

7. Method for separation of a harmful substance from a flue gas, and especially from sulfur oxide-containing combustion gas, in which
   (a) the flue gas is cooled,
   (b) the flue gas is divided into at least two parallel partial flows of which the first partial flow is passed through a first treatment zone constituted by at least one of a plurality of parallel connected absorption towers, and of which the second partial flow is passed through a second treatment zone constituted by at least one of said absorption towers not a part of said first zone,
   (c) for gas cleaning in said first treatment zone a first absorption liquid is introduced into the flue gas in that zone, while for cleaning of equipment surfaces of said second treatment zone a second absorption liquid is introduced into the flue gas in said second treatment zone, and
   (d) the two treatment zones are cyclically exchanged.

8. Apparatus for separation of a harmful substance, especially a sulphur oxide, from a flue gas stream, comprising:
   (a) an absorption heat exchanger having at least two parallel connected treatment zones adapted for the passage of flue gas therethrough,
   (b) means for furnishing flue gas to said heat exchanger,
   (c) means for supplying first and second absorption liquids respectively to the first and second treatment zones, said first absorption liquid being effective to clean said harmful substance substantially from said flue gas, said second absorption liquid being a solvent for a precipitate of said harmful substance formed upon cleaning with said first absorption liquid,
   (d) means for cyclically exchanging said first and second treatment zones to supply alternately in each zone said first absorption liquid and said second absorption liquid, and
   (e) means for flowing external air over said first and second treatment zones of said heat exchanger, in counterflow to said flue gas, to cool said flue gas during passage of said flue gas through said heat exchanger.

9. Apparatus according to claim 8 wherein said second treatment zone comprises one sixth of the heat exchanger arrangement.

10. Apparatus according to claim 9 wherein said means for cyclic exchange of the treatment zones is operable to effect such exchange at time intervals of one to four hours.

11. Apparatus according to claim 8 wherein the heat exchanger comprises a plurality of parallel pipes.

12. Apparatus according to claim 11 wherein the pipes of the heat exchanger extend vertically.

13. Apparatus according to claim 12 wherein said supply means includes spray nozzles for the absorption liquids arranged above an entry for the flue gas into the heat exchanger pipes.

14. Apparatus according to claim 11 wherein the pipes of the heat exchanger are arranged within an annular area and the pipes within a plurality of sectors are combined together to form one operational zone.

15. Apparatus according to claim 8 wherein said supply means includes for each treatment zone a respective supply system for absorption liquid, which system can be switched from said first to said second absorption liquid and vice versa.

16. Apparatus according to claim 15 wherein each supply system comprises condensate collection means arranged beneath an exit of the heat exchanger, a receiving container connected to receive condensate from the collection means, a lime water container connected to supply lime water to the receiving container via a metering arrangement, pH measuring means for measuring the pH value of liquid from said receiving container, and spray nozzle means for spraying absorption liquid into the corresponding operational zone.

17. Apparatus according to claim 8 wherein the heat exchanger has a flue gas stack passing centrally of a tube bundle.

18. Apparatus according to claim 17 wherein at a flue gas outlet of each zone two alternately closable openings are provided, one opening providing a connection to the flue gas stack and the other opening providing a connection via a bypass line and a blower to said flue gas furnishing means.

19. Apparatus according to claim 8 wherein said supply means includes a spray nozzle arrangement for spraying the first absorption liquid to both treatment zones and further spray nozzle arrangement for spraying the second absorption liquid to either of said treatment zones, selectively, and for preventing entry of first absorption liquid into the selected zone.

20. Apparatus according to claim 8 wherein a flue gas stack passes outside a pipe bundle of the heat exchanger and wherein a tube is provided centrally of the pipe bundle, said tube being rotatable about an axis and carrying a spray nozzle arrangement for the second absorption liquid, the spray nozzle arrangement being supplied via said tube.

21. Apparatus according to claim 8 wherein said heat exchanger comprises a bundle of vertical pipes, and wherein beneath an outlet of the heat exchanger a condensate collecting body is provided which rotates together with a rotatable tube disposed centrally of the pipe bundle, whereby said collecting body is adjustable for location beneath the second treatment zone.

22. Method according to claim 1 wherein the partial flow to said first treatment zone is larger than the partial flow to said second treatment zone.

* * * * *